US008099630B2

(12) United States Patent
Lim

(10) Patent No.: US 8,099,630 B2
(45) Date of Patent: Jan. 17, 2012

(54) HARDWARE DIAGNOSTICS DETERMINATION DURING INITIAL PROGRAM LOADING

(75) Inventor: Michael Y. Lim, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 12/181,491

(22) Filed: Jul. 29, 2008

(65) Prior Publication Data

US 2010/0031091 A1 Feb. 4, 2010

(51) Int. Cl.
*G06F 11/00* (2006.01)
(52) U.S. Cl. .............. 714/36; 714/25; 714/30; 714/703; 714/733; 713/100; 710/300; 710/303; 710/304
(58) Field of Classification Search .................... 714/25, 714/30, 703, 733; 713/100
See application file for complete search history.

(56) References Cited

U.S. PATENT DOCUMENTS

| | | | | |
|---|---|---|---|---|
| 5,530,847 | A * | 6/1996 | Schieve et al. | 714/38 |
| 5,600,766 | A * | 2/1997 | Deckys et al. | 345/641 |
| 5,996,072 | A * | 11/1999 | Noll et al. | 713/1 |
| 6,216,226 | B1 | 4/2001 | Agha et al. | |
| 6,493,803 | B1 * | 12/2002 | Pham et al. | 711/147 |
| 6,564,348 | B1 * | 5/2003 | Barenys et al. | 714/732 |
| 6,625,728 | B1 * | 9/2003 | Ahrens et al. | 713/2 |
| 2003/0163765 | A1 * | 8/2003 | Eckardt et al. | 714/36 |
| 2005/0033952 | A1 | 2/2005 | Britson | |
| 2005/0033970 | A1 * | 2/2005 | Anson et al. | 713/189 |
| 2005/0132177 | A1 * | 6/2005 | Challener et al. | 713/1 |
| 2005/0229042 | A1 * | 10/2005 | Crowell et al. | 714/36 |
| 2005/0240826 | A1 * | 10/2005 | Dickenson et al. | 714/42 |

OTHER PUBLICATIONS

Compaq, "Bios Boot Specs V1.01", Jan. 1996, p. 1-46.*
Compaq, "Plug and Play BIOS Specification V 1.0A", May 1994, 1-56.*
Dell, "Using Dell Server Diagnostic Tools", Feb. 2005, Dell, p. 1-6.*
Natarajan, "How to diagnose Memory (Hardware) issues in Dell Servers", Jun. 2008, thegeekstuff.com, p. 1-5.*

* cited by examiner

*Primary Examiner* — Robert Beausoliel, Jr.
*Assistant Examiner* — Jeison C Arcos
(74) *Attorney, Agent, or Firm* — Yudell Isidore Ng Russell PLLC

(57) ABSTRACT

Disclosed are a method, system and computer program product for determining hardware diagnostics during initial program loading (IPL). A space is allocated for a diagnostics hardware table storing hardware identifications corresponding to hardware to be tested. A hardware monitor function detects new and/or defective hardware. Hardware can be manually selected. A runtime diagnostics detects defective hardware. The hardware identifications corresponding to the new, failing, and/or selected hardware are added to the diagnostics hardware table. The hardware identification to be tested is acquired during the building of a system Hardware Objects Model (HOM). A diagnostics flag is set within HOM according to the diagnostics hardware table. Diagnostics are performed per HOM diagnostics flag indication. The diagnostics table is cleared, and the operating system is run. At system runtime, diagnostics code monitors for runtime error. If an error is detected but cannot be isolated to defective hardware, the suspected hardware identification will be added to diagnostics hardware table so that it can be verified on the next system IPL.

12 Claims, 3 Drawing Sheets

| DATABASE 200 | | | |
|---|---|---|---|
| HARDWARE 201 | DETECTED AS NEW 210 | DETECTED AS DEFECTIVE 220 | SELECTED BY USER 230 |
| A 202 | | | A (202) |
| B 203 | | | |
| C 204 | | C (204) | |
| D 205 | D (205) | | |
| E 206 | | | |
| F 207 | | | |
| G 208 | | | |

• • •

| DIAGNOSTIC HARDWARES TABLE 300 |
|---|
| HARDWARE IDENTIFICATIONS (IDs) 301 |
| AI 302 (HARDWARE ID FOR A 202) |
| CI 304 (HARDWARE ID FOR C 204) |
| DI 305 (HARDWARE ID FOR D 205) |

Fig. 3

HARDWARE DIAGNOSTICS DETERMINATION DURING INITIAL PROGRAM LOADING

BACKGROUND

1. Technical Field

The present invention generally relates to computer systems and in particular to determining hardware diagnostics during initial program loading (IPL).

2. Description of the Related Art

Current art methods of system initial program loading (IPL) are time consuming when hardware diagnostics is required. There is currently no ability to select a specific hardware within a system to be diagnosed during system IPL. Only a fast speed option or a slow speed option is currently available for system IPL. The fast IPL speed option does not provide any system hardware diagnostics during the system IPL. The slow IPL speed option diagnoses all of the hardware within the system, causing the system IPL process to take a long time to complete. When hardware is replaced in a system, the IPL speed is currently set to the slow IPL speed option so the newly added hardware can be diagnosed. However, setting the IPL speed to the slow IPL speed option causes the IPL diagnostics to diagnose all of the hardware inside the system, including existing hardware known to be good. Also, at system runtime when operating system (OS) applications are running on the system, if a system firmware detects a problem within a hardware subsystem and is not able to isolate the problem to the failing hardware, the system firmware sets the IPL speed to the slow IPL speed option. This causes all of the hardware in the system to be diagnosed at the next system IPL.

SUMMARY OF ILLUSTRATIVE EMBODIMENTS

Disclosed are a method, system and computer program product for determining hardware diagnostics during initial program loading (IPL). A space is allocated for a diagnostics hardware table storing hardware identifications corresponding to hardware to be tested. A hardware monitor function detects new and/or defective hardware. Hardware can be manually selected. A runtime diagnostics detects defective hardware. The hardware identifications corresponding to the new, failing, and/or selected hardware are added to the diagnostics hardware table. The hardware identification to be tested is acquired during the building of a system Hardware Objects Model (HOM). A diagnostics flag is set within HOM according to the diagnostics hardware table. Diagnostics are performed per HOM diagnostics flag indication. The diagnostics table is cleared, and the operating system is run. At system runtime, diagnostics code monitors for runtime error. If an error is detected but cannot be isolated to defective hardware, the suspected hardware identification will be added to diagnostics hardware table so that it can be verified on the next system IPL.

The above as well as additional features and advantages of the present invention will become apparent in the following detailed written description.

BRIEF DESCRIPTION OF THE DRAWINGS

The invention itself will best be understood by reference to the following detailed description of an illustrative embodiment when read in conjunction with the accompanying drawings, wherein:

FIG. 3 illustrates an example of a diagnostics hardware table, in accordance with one embodiment of the invention.

DETAILED DESCRIPTION OF AN ILLUSTRATIVE EMBODIMENT

Figures 1, 2:
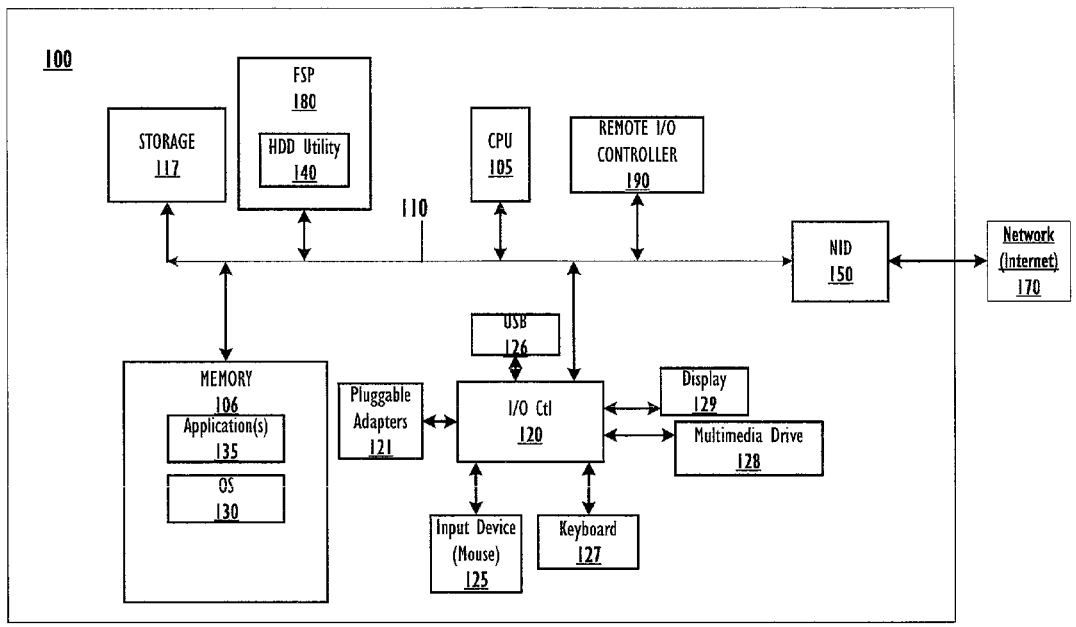
FIG. 1 is a block diagram of a data processing system configured with hardware and software components for implementing one or more embodiments of the invention.
FIG. 2 illustrates an example of a database, in accordance with one embodiment of the invention.

The illustrative embodiments provide a method, system and computer program product for determining hardware diagnostics during initial program loading (IPL). A space is allocated for a diagnostics hardware table storing hardware identifications corresponding to hardware to be tested. A hardware monitor function detects new and/or defective hardware. Hardware can be manually selected. A runtime diagnostics detects defective hardware. The hardware identifications corresponding to the new, failing, and/or selected hardware are added to the diagnostics hardware table. The hardware identification to be tested is acquired during the building of a system Hardware Objects Model (HOM). A diagnostics flag is set within HOM according to the diagnostics hardware table. Diagnostics are performed per HOM flag indication. The diagnostics table is cleared, and the operating system is run. At system runtime, diagnostics code monitors for runtime error. If an error is detected but cannot be isolated to defective hardware, the suspected hardware identification will be added to the diagnostics hardware table so that it can be verified on the next system IPL.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, FIG. 1 depicts a block diagram representation of a data processing system (and connected network). DPS 100 comprises at least one processor or central processing unit (CPU) 105 connected to system memory 106 via system interconnect/bus 110. System memory 106 is defined as a lowest level of volatile memory, including, but not limited to, cache memory, registers, and buffers. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVD drive) and USB (universal serial bus) port 126 are illustrated, coupled to I/O controller 120. Multimedia drive 128 and USB port 126 may operate as both input and output (storage) mechanisms. I/O controller 120 also provides connection for pluggable adapters 121. DPS 100 also comprises storage 117, within which data/instructions/code may be stored.

DPS 100 is also illustrated with network interface device (NID) 150 coupled to system bus 110. NID 150 enables DPS 100 to connect to one or more access networks 170, such as the Internet.

A Flexible Service Processor (FSP) 180 is connected to system bus 110 within DPS 100. The FSP 180 is a minicomputer inside the main computer or DPS 100. FSP 180 contains a processor unit, a memory, a storage device (flash memory) and I/O interfaces. The FSP 180 is responsible for providing service to the main computer or DPS 100, including handling hardware configuration, system power on/off, hardware initializing, and monitoring for system errors. The FSP 180 initial program loading (IPL) is performed when an alternating current (AC) is applied to the system. When FSP 180 is in a stable state but the main system or DPS 100 is at power off, this is called an FSP standby state. System IPL time occurs when power is being turned on (e.g., power on/off button, remote power on, time power on, or the like). System runtime occurs once an operating system (OS) 130 is running. The FSP 180 comprises a Hardware Diagnostics Determination (HDD) utility 140.

DPS 100 also comprises a Remote I/O Controller 190 to provide additional I/O adapters. Notably, in addition to the above described hardware components of DPS 100, various features of the invention are completed via software (or firmware) code or logic stored within FSP 180 or memory 106 or other storage (e.g., storage 117) and executed by FSP 180 or CPU 105. In one embodiment, data/instructions/code from storage 117 populates the system memory 106, which is also coupled to system bus 110. Thus, illustrated within memory 106 are a number of software/firmware components, including operating system (OS) 130 (e.g., Microsoft Windows®, a trademark of Microsoft Corp, or GNU®/Linux®, registered trademarks of the Free Software Foundation and The Linux Mark Institute, or Advanced Interactive eXecutive—AIX—, registered trademark of International Business Machines—IBM), and applications 135.

In actual implementation, applications 135 and Hardware Diagnostics Determination (HDD) utility 140 may be combined as a single application collectively providing the various functions of each individual software component when the corresponding code is executed by the FSP 180. For simplicity, HDD utility 140 is illustrated and described as a stand alone or separate software/firmware component, which is stored in the FSP 180 to provide/support the specific novel functions described herein.

FSP 180 executes HDD utility 140, which supports the user interface features of HDD utility 140. FSP 180 executes code/firmware that resides in its storage device. Among the software code/instructions provided by FSP 180, and which are specific to the invention, are: (a) code for allocating a space for a diagnostics table configured to store hardware identifications corresponding to hardware to be tested during initial program loading; (b) code for detecting a new hardware by a hardware monitor function; (c) code for adding hardware identifications corresponding to the new hardware detected to the diagnostics hardware table; (d) code for detecting defective hardware by the hardware monitor function; (e) code for adding hardware identifications corresponding to the defective hardware detected to the diagnostics hardware table; (f) code for manually selecting hardware for diagnostics; (g) code for adding hardware identifications corresponding to the selected hardware to the diagnostics hardware table; (h) code for acquiring hardware identification to be tested while a system Hardware Object Model (HOM) is built; (i) code for setting a diagnostics flag within HOM according to the diagnostics hardware table; (j) code for performing diagnostics on the hardware objects having diagnostics flags during initial program loading; (k) code for clearing diagnostics hardware table; and (l) code for initialize system hardware (DPS 100). For simplicity of the description, the collective body of code that enables these various features is referred to herein as FSP 180. According to the illustrative embodiment, when FSP 180 executes its code, FSP 180 initiates a series of functional processes that enable the above functional features as well as additional features/functionality, which are described below within the description of FIGS. 2-4.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

With reference now to FIG. 2, an example of a database 200 is shown. Hardware 201 for a system is listed on the database 200. The system in FIG. 2 includes A 202, B 203, C 204, D 205, E 206, F 207, and G 208. A hardware monitor function, which is a service processor function, detects new hardware, e.g. D 205. Hardware "detected as new" 210 is listed on the database 200. For example, hardware D 205 is new hardware. Hardware identifications corresponding to the new hardware, D 205, are added to a diagnostics hardware table, discussed in more detail in FIG. 3. The hardware monitor function also detects hardware that is suspected of being defective, such as C 204. Hardware suspected of being defective is listed as "detected as defective" 220 on the database 200. Hardware identifications corresponding to the defective hardware, C 204, are added to the diagnostics hardware table. A user can manually select hardware, such as A 202, to be tested during initial program loading. The manually selected hardware is listed as "selected by user" 230 on the database 200. Hardware identifications corresponding to the manually selected hardware, A 202, are added to the diagnostics hardware table.

While Hardware Object Models (HOM) are being built, the hardware identification of the hardware to be tested 202, 204, 205 is acquired. A diagnostics flag is set for each of the HOMs corresponding to the hardware to be tested 202, 204, 205, according to the diagnostics hardware table.

FIG. 3 is an example of a diagnostics hardware table 300. Space is allocated within a system for the diagnostics hardware table 300. The diagnostics hardware table 300 stores a list of hardware identifications 301 corresponding to hardware to be tested during initial program loading. In FIG. 3, the hardware identifications 301 include A1 302, C1 304, and D1

305. A1 302 is a hardware identification that corresponds to hardware A 202. A 202 was detected as a new hardware by a hardware monitor function, as described in FIG. 2. A1 302 was added to the diagnostics hardware table 300. C1 304 is a hardware identification that corresponds to hardware C 204, which was detected by the hardware monitor function as a hardware that is suspected of being defective. C1 304 was added to the diagnostics hardware table 300. D1 305 is a hardware identification that corresponds to hardware D 205, which is hardware manually selected to be tested during initial program loading. D1 305 was added to the diagnostics hardware table 300.

The hardware identifications 301 to be tested are acquired while system Hardware Object Models (HOM) are built. The HOM builds hardware objects for system initial program loading for the hardware corresponding to the hardware identifications 301 listed on the diagnostics hardware table 300 (e.g. A1 302, C1 304, and D1 305). A diagnostics flag is set within HOM for the hardware identifications 301 listed on the diagnostics hardware table 300 (e.g., A1 302, C1 304, and D1 305). If the diagnostics flag is set on a hardware object, diagnostics are performed on the hardware object. Otherwise the hardware object is ignored and a next hardware object is checked for the presence of a diagnostics flag.

After the diagnostics tests for all the required hardware objects is complete, the diagnostics hardware table 300 is cleared. Clearing the diagnostics hardware table 300 results in avoiding unnecessary testing of the same hardware during a subsequent initial program loading. When initial program loading is complete, the system reaches to system runtime, i.e. operating system (OS) is running and an application can be executed. During system runtime, if a hardware problem is detected by the FSP 180 diagnostics code and the FSP 180 is unable to isolate to the defective or failing device, the system will add a suspected defective or failing hardware to the diagnostics hardware table so that the suspected defective hardware can be tested on a next system initial program loading. For the current runtime, the suspected defective hardware is de-configured and will not be operable.

Figure 4:
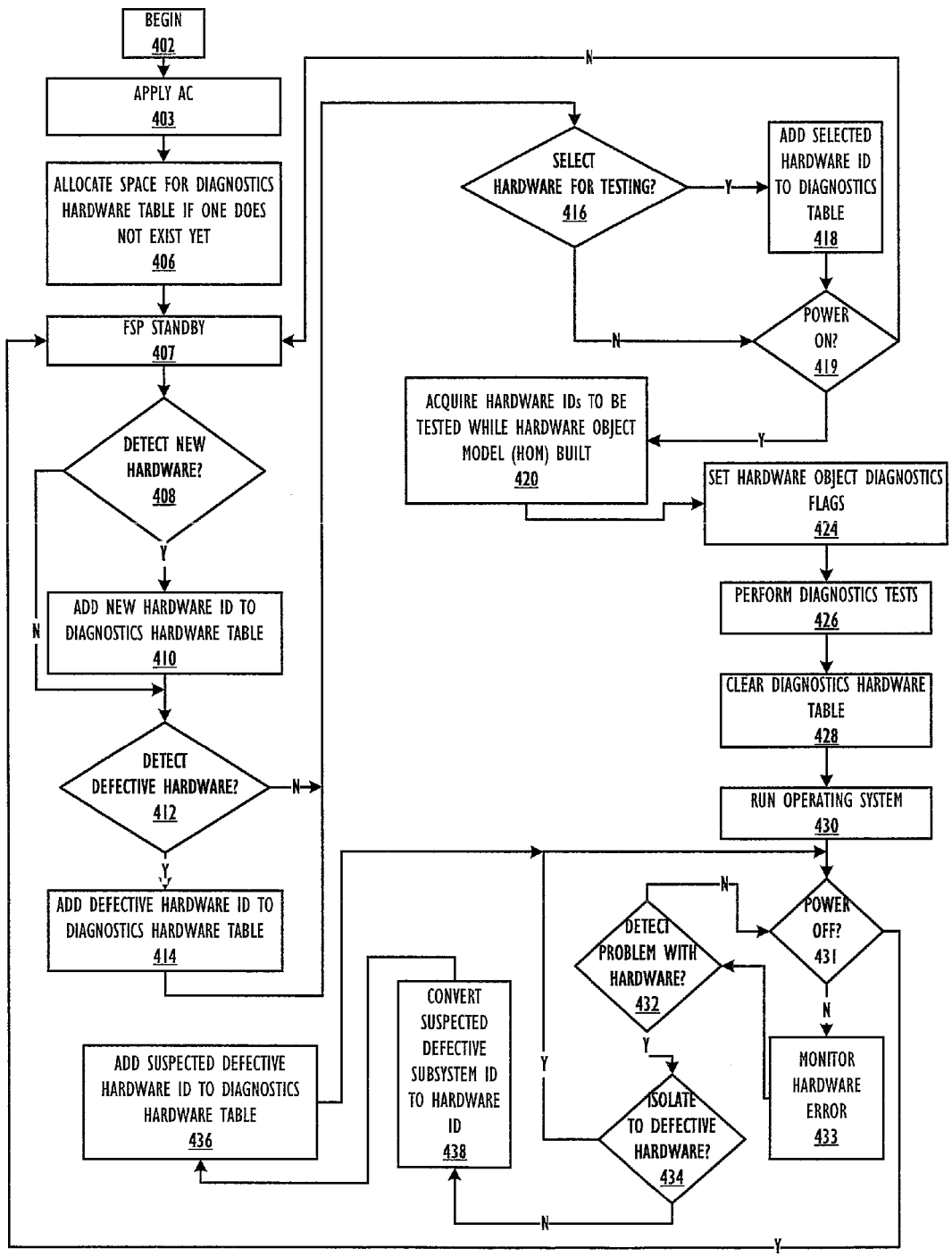
FIG. 4 is a flow chart of the process by which the features of the invention are implemented, according to one embodiment of the invention.

FIG. 4 is a flow chart illustrating one method by which the above process of the illustrative embodiments is completed. Although the method illustrated in FIG. 4 may be described with reference to components shown in FIG. 1, it should be understood that this is merely for convenience and alternative components and/or configurations thereof can be employed when implementing the method. Key portions of the method may be completed by HDD utility 140 and FSP 180 executing within DPS 100 (FIG. 1) and controlling specific operations of/on DPS 100, and the methods are thus described from the perspective of either/both HDD utility 140 and FSP 180.

The process of FIG. 4 begins at initiator block 402 when power is applied to DPS 100 and proceeds to block 406, at which a space is allocated for a diagnostics hardware table, block 406, if a diagnostics hardware table does not already exist. It is understood that if a system has previously created a diagnostics hardware table, a diagnostics hardware table would already exist with some data from a previous initial program loading. The diagnostics hardware table is configured to store hardware identifications that correspond to hardware to be tested during initial program loading.

FSP 180 entering FSP standby, block 407.

A determination is made regarding whether new hardware is detected, block 408, by a hardware monitor function. If new hardware is detected, the hardware monitor function adds a hardware identification that corresponds to the hardware detected as new to the diagnostics hardware table, block 410, and the process continues to a determination step at block 412. If no new hardware is detected, the process skips the adding step at block 410, and the process continues to the determination step at block 412.

A determination is made at block 412 by a hardware monitor function regarding whether any of the hardware is suspected of being defective, block 412. If hardware suspected as defective is detected by the hardware monitor function, hardware identifications corresponding to the defective hardware is added to the diagnostics hardware table, block 414, and the process continues to a determination step at block 416. If no defective hardware is detected, the process skips the adding step at block 414, and proceeds to the determination step at block 416.

A determination is made regarding whether hardware is manually selected to be tested during initial program loading, block 416. Hardware can be selected by a user for testing during initial program loading. If hardware is selected manually, hardware identifications corresponding to the selected hardware are added to the diagnostics hardware table, block 418. A determination is made regarding whether FSP is monitored for system power on, block 419. If no hardware is manually selected, the process skips the adding step at block 418, and proceeds to block 419. FSP is monitored for system power on, block 419. If power on is detected, the process continues to block 420. If FSP does not detect system power on is being requested, the process continue to FSP standby, block 407.

Hardware identifications to be tested are acquired while system Hardware Object Models (HOM) are built, block 420. Diagnostics flags are set according to the diagnostics hardware table, block 424. The initial program loading diagnostics performs diagnostics on hardware objects having diagnostics flags set, block 426. Initial program loading diagnostics does not perform diagnostics on hardware objects that do not have diagnostics flags set. After initial program loading diagnostics completes the diagnostics for all the required hardware objects, initial program loading diagnostics clears the diagnostics hardware table, block 428. Clearing the diagnostics hardware table prevents unnecessarily testing hardware again on a subsequent initial program loading. When the initial program loading is complete, the system reaches to system runtime, i.e. operating system (OS) is running, block 430, and applications can be executed.

While the system is in operation (OS is running), a determination is made regarding whether the power is off, block 431. If the power is off, the runtime process ends and the cycle start again by looping back to block 407 (FSP standby). If the power is not off, the system is monitored for hardware error, block 433. A determination is made regarding whether any problems are detected with hardware by system firmware, block 432. If no problems are detected with hardware, the process repeats to the determination step at block 431 regarding whether the power is off. If system firmware detects any problems with hardware at system runtime, a determination is made regarding whether the system can isolate the problem to the defective hardware, block 434. If the system can isolate the problem to the defective hardware, the process repeats to the determination step at block 431 regarding whether the power is off.

If the system cannot isolate the problem to defective hardware, block 434, the suspected defective subsystem identification is converted to hardware identifications, block 438. The suspected defective hardware identification is added to the diagnostics hardware table, block 436, and the process repeats to the determination step at block 431 regarding whether the power is off.

In the flow chart above, one method is embodied in a computer readable medium containing computer readable code such that a series of steps are performed when the computer readable code is executed on a computing device. In some implementations, certain steps of the method are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The method of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A system for determining hardware diagnostics during initial program loading, comprising:
    a processor;
    a storage facility that stores hardware identifications corresponding to hardware to be tested;
    a memory having stored thereon a utility which executes on the processor to provide the functions of:
        allocating a space for a diagnostics hardware table configured to store hardware identifications corresponding to hardware to be tested during the initial program loading;
        detecting new hardware by a hardware monitor function;
        adding hardware identifications corresponding to the new hardware detected to the diagnostics hardware table;
        detecting defective hardware by the hardware monitor function;
        adding hardware identifications corresponding to the defective hardware detected to the diagnostics hardware table;
        selecting hardware manually;
        adding hardware identifications corresponding to the selected hardware to the diagnostics hardware table;
        acquiring the hardware identifications to be tested while hardware objects are built by a system Hardware Object Model (HOM);
        setting diagnostics flags within the HOM according to the diagnostics hardware table;
        performing diagnostics on the hardware objects having set diagnostics flags during the initial program loading;
        clearing the diagnostics hardware table following completion of the diagnostics to prevent testing of hardware associated with the hardware objects having set diagnostics flags during the initial program loading during a subsequent initial program loading; and
        running an operating system following completion of the initial program loading.

2. The system of claim 1, said utility further comprising converting a suspected defective subsystem identification detected at runtime to a hardware identification.

3. The system of claim 2, said utility further comprising adding the hardware identification of the suspected defective subsystem identification detected at runtime to the diagnostics hardware table.

4. The system of claim 3, said utility further comprising diagnosing the hardware identification of the suspected defective subsystem identification detected at runtime in the diagnostics hardware table during the subsequent initial program loading.

5. A method for determining hardware diagnostics during initial program loading, comprising:
    allocating a space for a diagnostics hardware table configured to store hardware identifications corresponding to hardware to be tested during the initial program loading;
    detecting new hardware by a hardware monitor function;
    adding hardware identifications corresponding to the new hardware detected to the diagnostics hardware table;
    detecting defective hardware by the hardware monitor function;
    adding hardware identifications corresponding to the defective hardware detected to the diagnostics hardware table;
    selecting hardware manually;
    adding hardware identifications corresponding to the selected hardware to the diagnostics hardware table;

acquiring the hardware identifications to be tested while hardware objects are built by a system Hardware Object Model (HOM);

setting diagnostics flags within the HOM according to the diagnostics hardware table;

performing diagnostics on the hardware objects having set diagnostics flags during the initial program loading;

clearing the diagnostics hardware table following completion of the diagnostics to prevent testing of hardware associated with the hardware objects having set diagnostics flags during the initial program loading during a subsequent initial program loading; and running an operating system following completion of the initial program loading.

6. The method of claim 5, further comprising converting a suspected defective subsystem identification detected at runtime to a hardware identification.

7. The method of claim 6, further comprising adding the hardware identification of the suspected defective subsystem identification detected at runtime to the diagnostics hardware table.

8. The method of claim 7, further comprising diagnosing the hardware identification of the suspected defective subsystem identification detected at runtime in the diagnostics hardware table during the subsequent initial program loading.

9. A computer program product having code recorded on a computer readable storage medium for determining hardware diagnostics during initial program loading, said program product comprising code for:

allocating a space for a diagnostics hardware table configured to store hardware identifications corresponding to hardware to be tested during the initial program loading;

detecting new hardware by a hardware monitor function;

adding hardware identifications corresponding to the new hardware detected to the diagnostics hardware table;

detecting defective hardware by the hardware monitor function;

adding hardware identifications corresponding to the defective hardware detected to the diagnostics hardware table;

selecting hardware manually;

adding hardware identifications corresponding to the selected hardware to the diagnostics hardware table;

acquiring the hardware identifications to be tested while hardware objects are built by a system Hardware Object Model (HOM);

setting diagnostics flags within the HOM according to the diagnostics hardware table;

performing diagnostics on the hardware objects having set diagnostics flags during the initial program loading;

clearing the diagnostics hardware table following completion of the diagnostics to prevent testing of hardware associated with the hardware objects having set diagnostics flags during the initial program loading during a subsequent initial program loading; and running an operating system following completion of the initial program loading.

10. The computer program product of claim 9, further comprising code for converting a suspected defective subsystem identification detected at runtime to hardware identification.

11. The computer program product of claim 10, further comprising code for adding the hardware identification of the suspected defective subsystem identification detected at runtime to the diagnostics hardware table.

12. The computer program product of claim 11, further comprising code for diagnosing the hardware identification of the suspected defective subsystem identification detected at runtime in the diagnostics hardware table during the subsequent initial program loading.

* * * * *